United States Patent
Hildebrand

[11] 3,997,266
[45] Dec. 14, 1976

[54] LENS TESTING USING TOTAL INTERNAL REFLECTION HOLOGRAPHY

[75] Inventor: Bernard P. Hildebrand, Richland, Wash.

[73] Assignee: The United States of America as represented by the Secretary of the Army, Washington, D.C.

[22] Filed: Sept. 26, 1975

[21] Appl. No.: 617,204

[52] U.S. Cl. .................................. 356/109; 350/3.5
[51] Int. Cl.$^2$ ...................... G01B 9/02; G03H 1/04
[58] Field of Search ...................... 350/3.5; 356/109

[56] References Cited
UNITED STATES PATENTS

| | | | |
|---|---|---|---|
| 3,551,018 | 12/1970 | Stetson | 350/3.5 |
| 3,833,301 | 9/1974 | Moore | 350/3.5 |

FOREIGN PATENTS OR APPLICATIONS

| | | | |
|---|---|---|---|
| 1,592,520 | 5/1970 | France | 350/3.5 |

OTHER PUBLICATIONS
Snow et al., Applied Optics, vol. 9, No. 4, Apr. 1970, pp. 822–827.

Primary Examiner—Ronald J. Stern
Attorney, Agent, or Firm—Nathan Edelberg; Robert P. Gibson; Arthur M. Suga

[57] ABSTRACT

Accurate, rapid and inexpensive testing and inspecting of lens surfaces through holographic means requiring no beamsplitters, mirrors or overpower optics, and wherein a hologram formed in accordance with one aspect of the invention contains the entire interferometer and serves as both a master and illuminating source for both concave and convex surfaces to be so tested.

11 Claims, 6 Drawing Figures

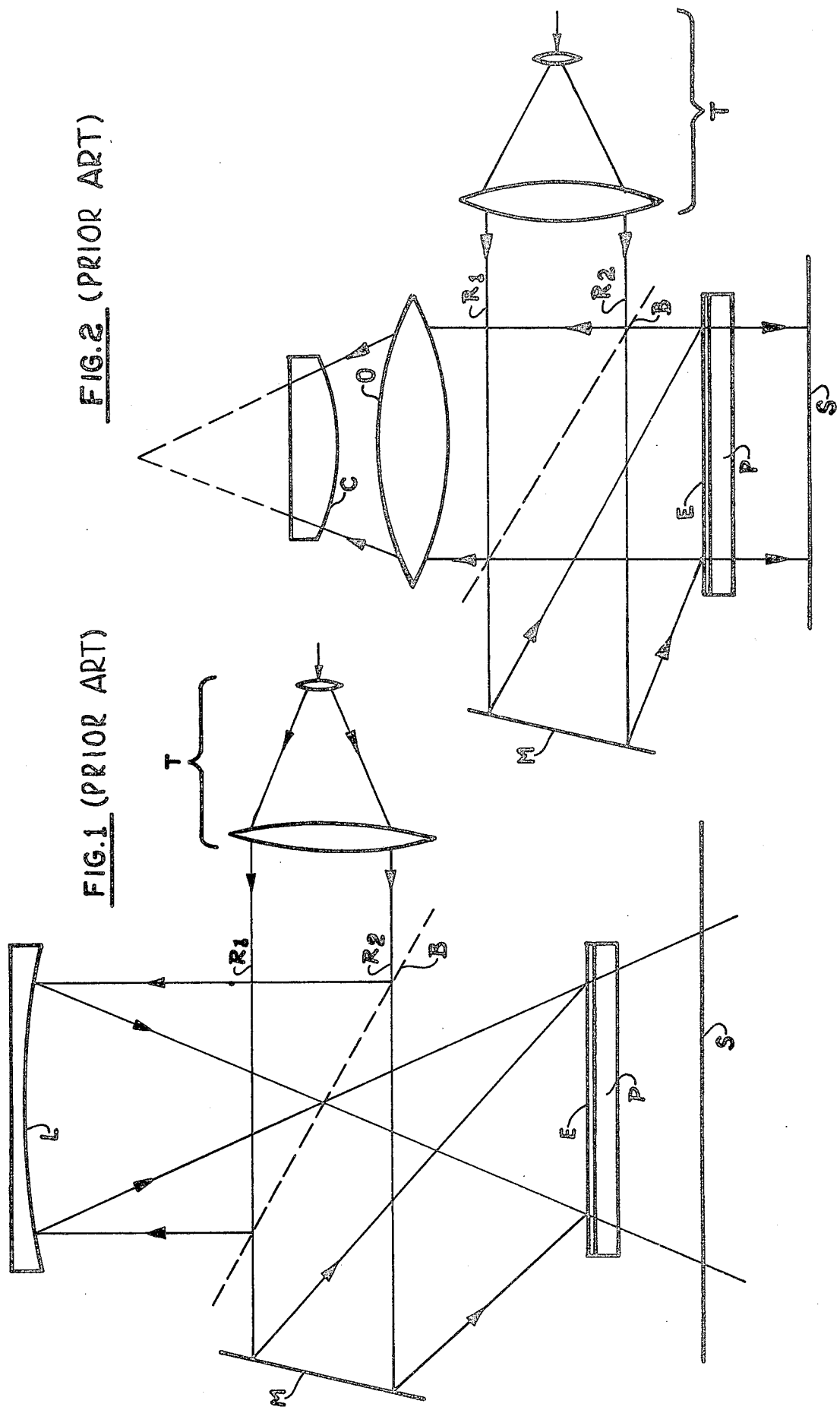

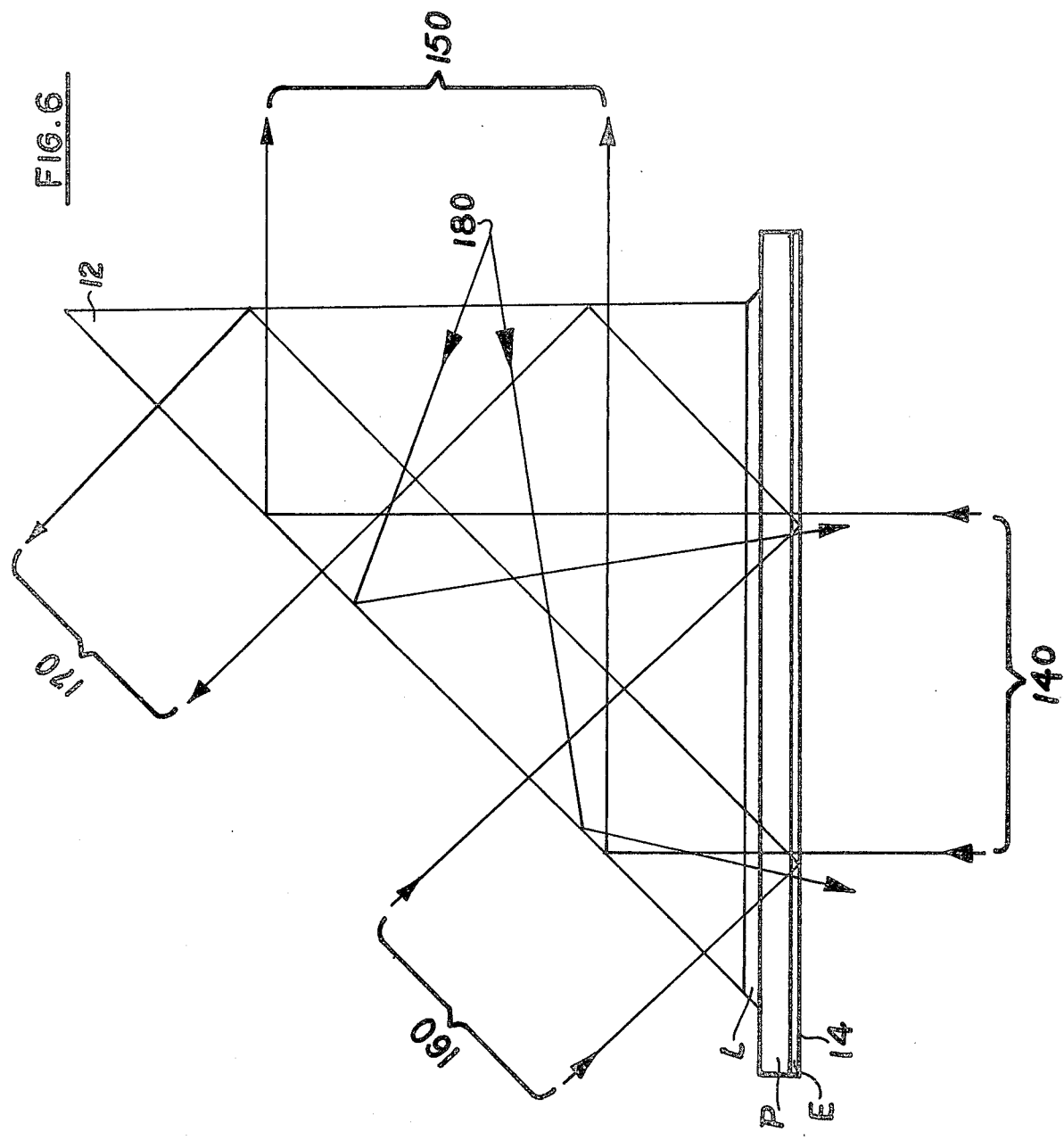

LENS TESTING USING TOTAL INTERNAL REFLECTION HOLOGRAPHY

The invention described herein may be manufactured, used and licensed by or for the Government for governmental purposes without the payment to me of any royalty thereon, and was made in the course of, or under a contract with the Energy Research and Development Administration (successor to United States Atomic Energy Commission).

Reference is hereby made to patent application Ser. No. 539,885, now U.S. Pat. No. 3,953,129, of Bernard P. Hildebrand, for "Testing and Inspecting Lens by Holographic Means," filed 9 Jan. 1975 and assigned to the same assignee of this patent application.

This invention relates to lens testing and inspection and more particularly concerns improved optical holographic means for the rapid and economic testing and inspection of lenses during their fabrication processes.

The use of holograms in place of test glasses for the inspection of lens surfaces during their polishing phase is not new. The prior art devices and methods, in the main, employ interferometers, which are quite satisfactory in the testing of special optics, such as aspherics and larger aperture optics, but are generally inadequate when it comes to routine testing of mass production lenses such as are required for many and various military applications.

Test glass usage is based upon the observation of Newton's rings formed therein which are produced by multiple reflections between two nearly coincident surfaces. This method requires each lens design desired or to be fabricated to have a set of precision test glasses ground and polished to the identical configuration of the desired lens surface, but of opposing curvature. At various stages of manufacture of these lenses, the test glass will be placed in contact with the lens to be manufactured and the fringes examined. If the fringes are perfectly circular, the surface being tested is a good one. If, however, the fringes are asymmetrical or jagged, further polishing of the lens desired or to be fabricated will be required. The power or curvature of the surfaces may be determined by the number of rings observed, i.e., if the power is identical to that of the test glass, a single fringe will spread across the entire surface of the test glass. Since lens curvature will change during the polishing thereof, a family of test glasses will be required for each specific lens design to be fabricated. Further, since test glasses must contact the lens to be manufactured, digs and scratches on the test glass surfaces do occur, thus necessitating costly and occasional resurfacing thereof.

It is apparent then that the prior art test glass means for testing and inspecting lens surfaces is not only expensive, but is time consuming and requires the careful storage of a multitude of differing test glasses having varying curvatures.

Accordingly, it is an object of the invention to provide an accurate, rapid and inexpensive means for testing and inspecting lens surfaces.

Another object of the invention is to provide such means for the testing and inspection of lens surfaces which may readily be performed at any stage of lens fabrication.

Still another object of the invention is to provide such means which obviates any necessity of auxiliary equipment such as beamsplitters, mirrors and overpower optics and wherein said means contains the entire interferometer.

Other objects and advantages of the invention will become apparent from the following description and accompanying drawings wherein:

FIGS. 1 and 2 diagrammatically depict prior art holographic means for testing lens surfaces.

FIG. 6 illustrates diagrammatically the making of a hologram without the use of a master surface according to my invention.

In the basic technique of off-axis holography, two coherent radiation beams are brought together with a finite angle therebetween at a radiation detector to form an interference pattern thereon. For optical holography, the radiation is within the visible region and the detector is usually photographic film which records the interference pattern between the two light radiation beams. One light beam is modified by the object scene to be recorded and the other light beam serves as a reference beam. After exposure and development of the photographic film, it is illuminated with a light beam similar to the reference beam used in constructing the hologram. The reconstructing light beam is diffracted by the recorded interference pattern into at least one diffracted beam which carries information of the object scene for viewing. An image of the object scene is so viewed in full three dimensions including parallax effects as if the object scene itself were being viewed.

With the above general background information in mind, reference will now be made to the drawings, and particularly to FIGS. 1 and 2 thereof, which depict typical prior art holographic lens testing means, wherein a beam of coherent rays, represented as $R_1$ and $R_2$, emanating from a telescope T, for example, strike beamsplitter B, a portion of the rays being deflected to the concave optic L, which may be the master surface, or the lens to be tested, and the other portion passing therethrough to mirror M, all of the rays being respectively reflected onto a light-sensitive recording medium, such as photographic film or plate P, including an emulsion layer E, which comprises the hologram to be made. In the actual making of the hologram, the master surface will be fixed into place and the hologram developed by conventional means as aforedescribed and in accordance with FIG. 1 and 2. The newly made hologram having interference pattens recorded therein will now be reinserted into the system and the master surface replaced by the optic or lens surface to be tested. Interference will then occur between the wavefront of the master reconstructed by the hologram and the wavelength reflected by the optical surface to be tested. Fringes identical to those obtained by the test glass methods will appear on screen S.

Identical interferometric principles are employed when convex surfaces are to be tested, as depicted in FIG. 2, in which case an overpower optic O will be interposed before the convex surface C. The overpower optic is required to provide illumination to the test surface in such a direction that reflected rays from the test surface will not escape the system.

Figure 3:
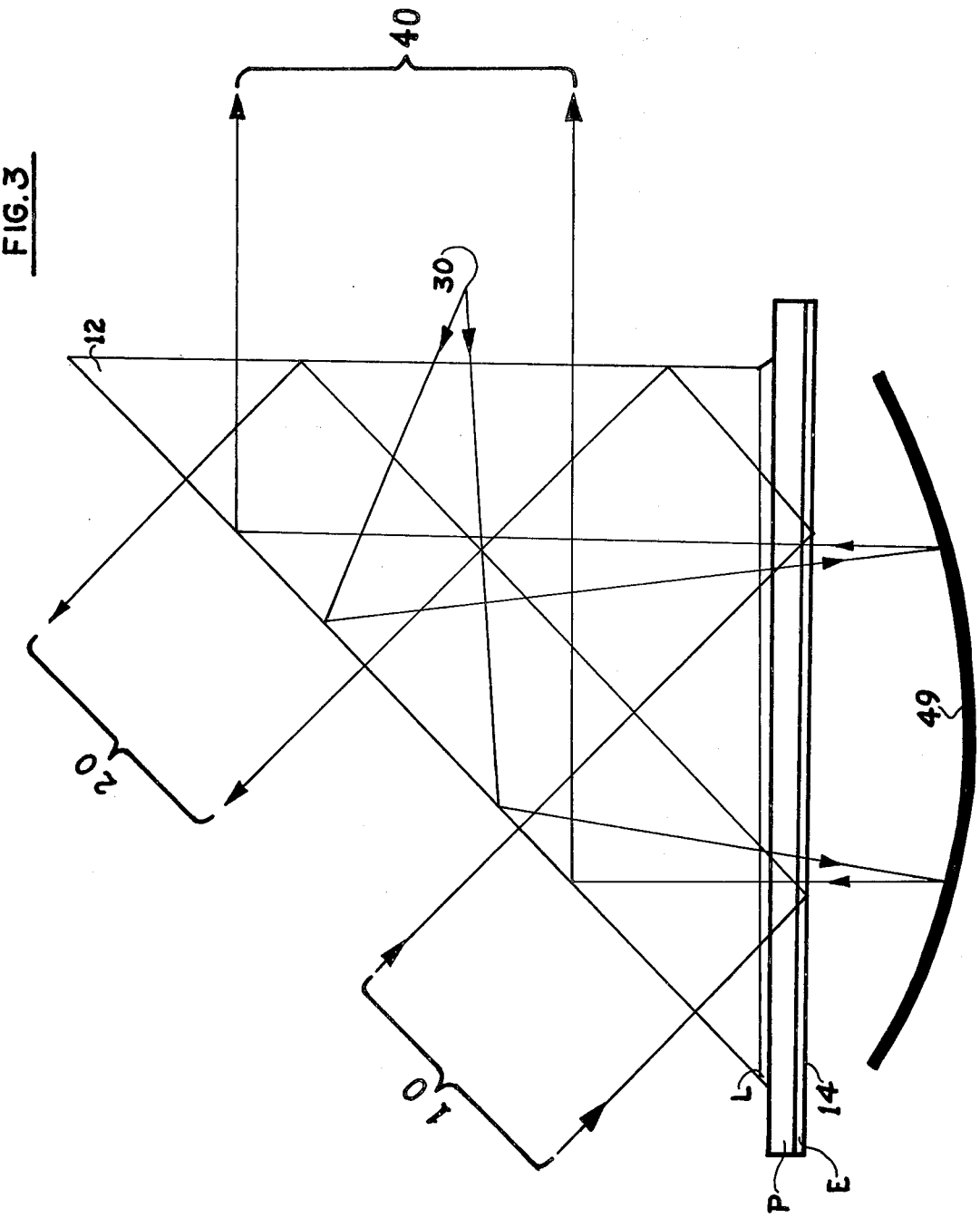
FIG. 3 illustrates diagrammatically the making of a hologram in accordance with my invention.

Referring now to FIG. 3 of the drawings, which diagrammatically illustrates the making of a hologram in accordance with one aspect of my invention, two illuminating beams 10 and 30, the latter diverging from a point near the focal plane of master surface 49, and the former directed thru a prism 12, suitably 45°-90°-45°, through liquid gate or couplant L to an unbacked photographic plate P, having emulsion layer E facing master surface 49. Liquid couplant L couples prism 12 to plate P by any index matching chemical, such, for example, as triethanolamine. Collimated beam 10 is directed into prism 12 and encounters emulsion-air interface 14 at a critical angle and is totally reflected back into the prism as shown to form beam 20. Beam 30 is reflected from the hypotenuse side of prism 12 thru liquid couplant L, photographic plate P, and into emulsion layer E to master surface 49 where it is reflected back thru the plate and prism to form beam 40 of the master surface. Thus, a total of four beams, i.e., beams 10, 20, 30, and 40 mutually interfere in emulsion E, any two of which may be considered as forming a hologram in the emulsion, or a total of 6 holograms in all. The 6 holograms are thus formed by beams 10 and 40; 20 and 40; 10 and 20; 30 and 40; 20 and 30; and 10 and 30. Only the transmission hologram formed by beams 10 and 30 and the transmission hologram formed by beams 20 and 40 (beams 20 and 40 are both transmitted thru the photographic plate from emulsion E) are useful for the purposes of my invention, the remaining holograms being of the reflection type which will be suppressed by the natural instabilities of the set-up.

The holograms thus formed in the emulsion may now be used to test concave and convex surfaces.

Figure 4:
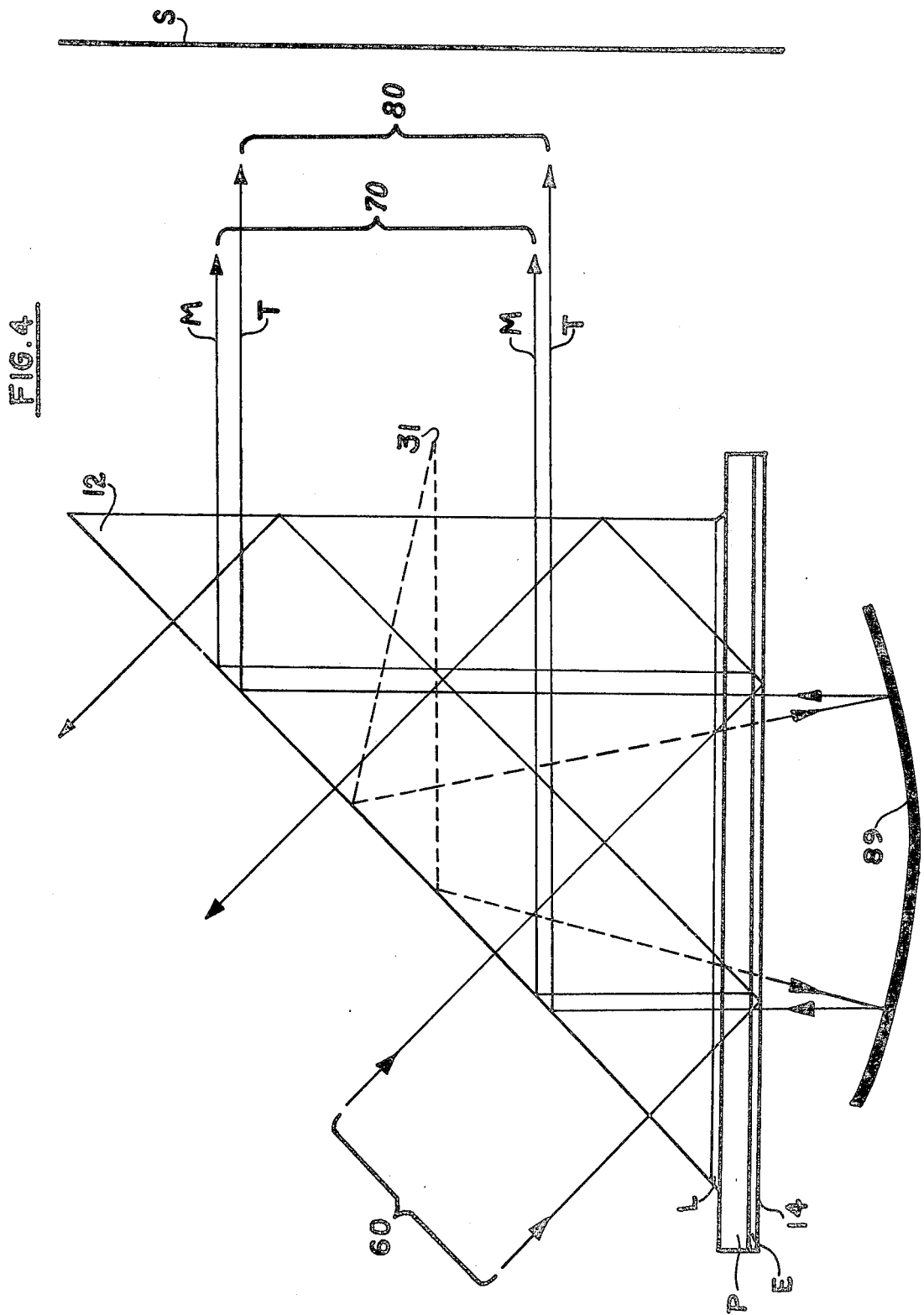
FIGS. 4 and 5 illustrate the testing of concave and convex lens surfaces respectively using the hologram made in accordance with my invention.

Reference will now be made to FIG. 4 of the drawings for the testing of concave surfaces. The master surface 49 (FIG. 3) will be replaced by concave surface to be tested 89 of substantially the same curvature, the holograms recorded in emulsion E now being partially illuminated by beam 60 which is an exact replica of beam 10 (FIG. 3) used in making the hologram. Only the wavefronts reconstructed by the two useful holograms described above are shown. Reflected beam 40 (FIG. 3) of the master surface, already in the hologram, is shown by beam 70, the rays thereof being designated M—M. Since a surface of substantially the same curvature as the master is being tested, a true image will be used. Hologram formed by beam 10 (FIG. 3) and beam 30 (FIG. 3) when illumnated by beam 60 reproduces beam 30, shown in phantom lines at 31, thus illuminating the test surface 89 and yielding a reflected beam which passes back thru the hologram to form test beam 80 which interfers with beam 70, beam 70 representing a master beam. Any difference between the test beam 80 and master beam 70 will be revealed as an interference pattern on screen S. Conversely, the test beam and master beam will coincide if the test surface is absolutely identical with the master surface. The curvature of the test surface may be measured by changing the distance between it and the hologram until null occurs.

Figure 5:
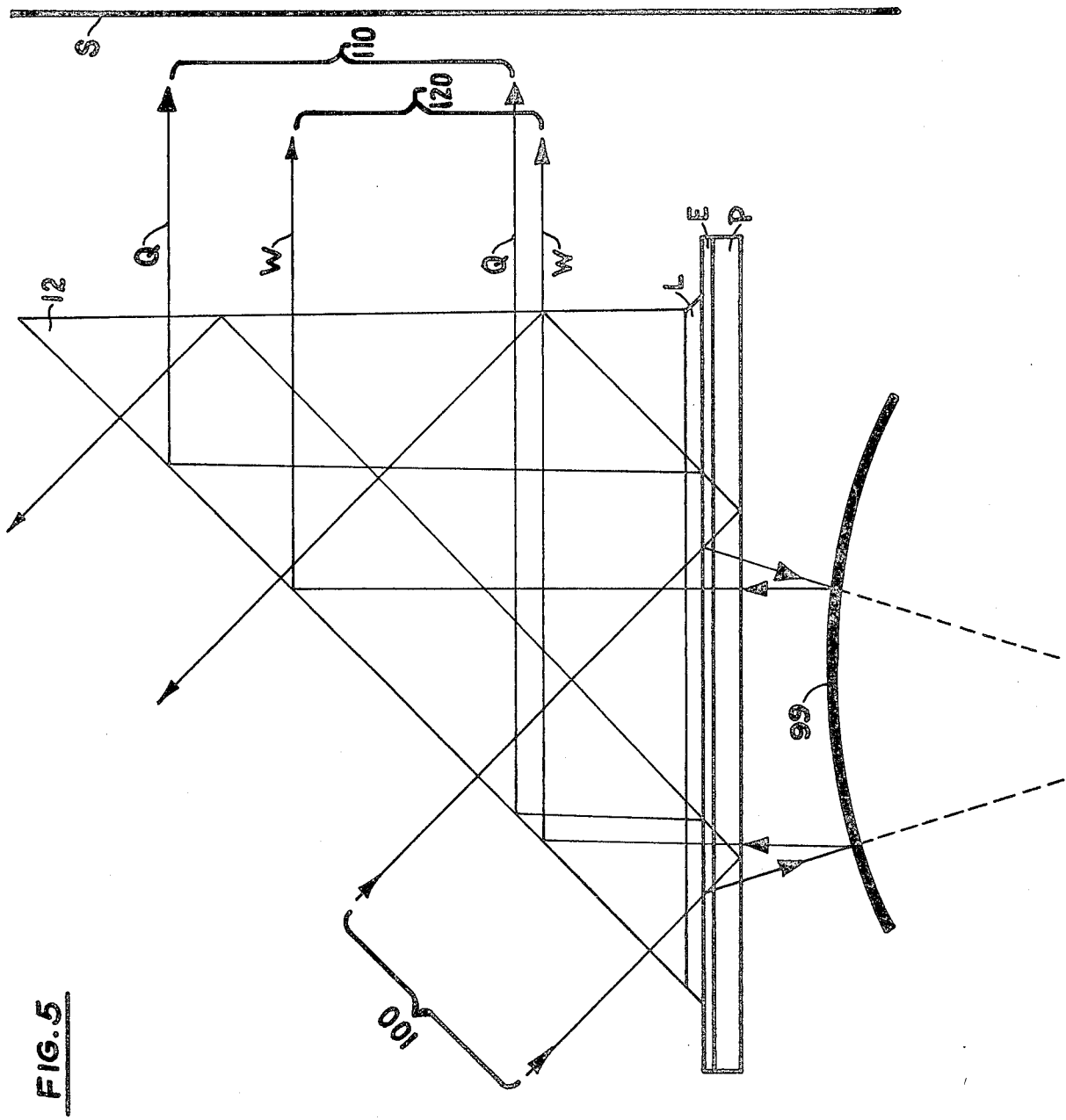

The same hologram used in testing concave surfaces can readily be employed in testing convex surfaces as diagrammatically illustrated in FIG. 5 of the drawings, by reconstructing the conjugate wavefronts which may be accomplished by simply rotating the hologram about a vertical axis. Since emulsion layer E now faces the prism, the hologram will be illuminated from a direction opposite to that of beam 10 (FIG. 3) by another collimated beam 100, an exact replica of beam 10, which results in the reconstruction of a wavefront identical to the wavefront reflected by the master surface 49 (FIG. 3) from beam 30 (FIG. 3), but of opposite curvature, represented in FIG. 5 by master wave 110. Recorded hologram formed by beams 10 and 30 (FIG. 3) projects a converging wavefront of curvature equal to beam 30 which is reflected by convex test surface 99, which beam passes back thru the hologram to interfere with the master beam 110, rays thereof being designated Q—Q. The beam reflected by convex test surface 99 produces a test beam 120, having rays W—W. Beam 110, representing a master surface of curvature opposite to surface 49 (FIG. 3), interferes with beam 120 in screen S where interference fringes representing the difference between the test surface as represented by beam 120 and the master surface can be viewed.

Beam 130 is shown in dotted lines because convex test surface 99 interrupts rays comprising beam 130.

In accordance with another aspect of my invention, a hologram may be made for testing and inspecting concave or convex surfaces without the need for any master surface such as that required in making the hologram of FIG. 3. Thus, as diagrammatically illustrated in FIG. 6, collimated beam 140, is introduced into prism 12 to emerge as beam 150, which is identical to beam 40 of FIG. 3. The useful holograms are thus formed by beam 160 interfering with beam 180, and beam 170 interfering with beam 150, both holograms being of the transmission type. This resultant hologram may now be used similarly to the one formed in the description of FIG. 3 above.

In the practice of my invention, any suitable holder for receiving the hologram, and a jig for holding the surface to be tested, such for example, as a collar against which the surface may be held by hand, or by a micrometer stage for measuring power precisely, will be satisfactory. Of course, a source of coherent diverging light will also be required.

It is apparent from the foregoing description that I have provided holographic testing and inspecting means wherein the hologram contains the entire interferometer, and serves as both a master and an illuminating source for the surface to be so tested or inspected. No overpower optic is needed for testing convex surfaces, nor mirrors or beamsplitters for concave or convex surfaces. Further, all of the complicated optics takes place in the recording process step and not in the test instrument.

I claim:
1. In a process for holographically testing concave and convex surfaces wherein a hologram serves as both a master and an illuminating source for said surfaces to be tested, said process requiring no overpower optics, mirrors or beamsplitters, said process comprising the steps of making a hologram of a master surface by means of a first beam and a second beam, illuminating said master surface by said first beam thru a prism and an unbacked photographic plate, said prism having a first side, an hypotenuse side, and another side adjacent said photographic plate, a liquid couplant interposed between said another side and said photographic plate, an emulsion layer disposed on opposite side of said plate and facing said master surface, said first beam diverging from a point near focal plane of said master surface and directed into said first side of said prism to be reflected onto said master surface, and said second beam being collimated and directed into said hypotenuse side of said prism for deflection thereof after striking emulsion-air interface, forming a plurality of holograms on said photographic plate including images of said master surface in transmission thru said pair of illuminating beams, and placing said hologram containing said transmission holograms before a concave or convex surface for holographically testing the surfaces thereof.

2. The process as described in claim 1 wherein said prism is 45°-90°-45°.

3. The process as described in claim 2 wherein an image of one of said transmission holograms of said master surface is formed by said first beam comprising said diverging beam which interferes with said second beam comprising said collimated beam which is directed into said hypotenuse side of said prism thru said photographic plate and said emulsion; and another of said transmission holograms of said master surface is formed by reflection of said first beam from said master surface to form a third beam which interferes in said emulsion with reflection from air-emulsion interface of said second beam to provide a fourth beam.

4. The process as described in claim 3 wherein said surface to be tested is concave and comprising the steps of replacing said master surface with said concave surface of substantially equal curvature, illuminating said hologram through said hypotenuse of said prism with a fifth beam replicating said second beam, said hologram forming a sixth beam replicating said first beam and a seventh beam replicating said third beam, said sixth beam illuminating said concave surface to provide an eighth beam representing a test beam which interfers with said seventh beam, viewing said seventh and eighth beams on a screen indicating interference fringes representing differences between said master and concave surfaces.

5. The process as described in claim 3 wherein said surface to be tested is convex and comprising the steps of rotating 180° the hologram comprising the unbacked photographic plate and emulsion about its longitudinal axis such that said emulsion layer faces said prism, replacing said master surface with said convex surface of substantially equal radius, illuminating said hologram thru said hypotenuse of said prism by a ninth beam which replicates said second beam, said hologram forming a tenth beam being opposite in curvature to said first beam and an eleventh beam; said eleventh beam being opposite in curvature to said third beam, said tenth beam illuminating said convex surface to provide a twelfth beam representing a test beam which interferes with said eleventh beam, viewing said eleventh and twelfth beams on a viewing screen indicating interference fringes representing differences between said master and convex surfaces.

6. A process for holographically testing a concave lens surface wherein a hologram serves as both a master and an illuminating source for said concave surface to be tested, said process requiring no master surface and comprising the steps of making a hologram of a lens surface substantially identical to the surface of the concave lens to be tested by illuminating a photographic plate with 3 coherent light beams, said plate being disposed adjacent one side of a prism, a liquid couplant interposed between said plate and said one side of said prism and an emulsion layer on the other side of said plate to form an emulsion-air interface, directing the first one of said beams into said prism thru said emulsion and plate to form a first beam having a plane wave representative of a master surface, directing the second of said beams which diverges from a point near focal plane of surface to be tested into another side of said prism, and directing the third of said beams into hypotenuse side of said prism for deflection thereout after striking emulsion-air interface, said third beam being collimated, each of said beams being caused to interfere with each other to form at least two transmission holograms on said plate, and placing said hologram containing said transmission holograms before a concave surface for holographically testing the surface thereof.

7. The process as described in claim 6 wherein said prism is 45°-90°-45°.

8. The process as described in claim 7 wherein one of said transmission holograms is formed by said third beam directed into hypotenuse side of said prism interfering with said second beam diverging from a point near focal plane of concave surface to be tested.

9. The process as described in claim 7 wherein another of said transmission holograms is formed by a fourth beam interfering with said first beam, said fourth beam comprising said third beam reflected from said emulsion-air interface.

10. The process as described in claim 6 for holographically testing a convex lens surface and wherein a hologram is made of a lens surface substantially identical to the surface of a convex lens to be tested and wherein said hologram containing said transmission holograms is placed before a convex surface for holographically testing the surfaces thereof.

11. The process as described in claim 10 wherein said prism is 45°-90°-45°.

* * * * *